(12) United States Patent
Chou

(10) Patent No.: US 9,526,091 B2
(45) Date of Patent: *Dec. 20, 2016

(54) METHOD AND APPARATUS FOR COORDINATION OF SELF-OPTIMIZATION FUNCTIONS IN A WIRELESS NETWORK

(75) Inventor: Joey Chou, Scottsdale, AZ (US)

(73) Assignee: Intel Corporation, Santa Clara, CA (US)

(*) Notice: Subject to any disclaimer, the term of this patent is extended or adjusted under 35 U.S.C. 154(b) by 794 days.

This patent is subject to a terminal disclaimer.

(21) Appl. No.: 13/570,941

(22) Filed: Aug. 9, 2012

(65) Prior Publication Data

US 2013/0242720 A1 Sep. 19, 2013

Related U.S. Application Data

(60) Provisional application No. 61/612,188, filed on Mar. 16, 2012.

(51) Int. Cl.
*H04W 92/04* (2009.01)
*H04W 52/02* (2009.01)
(Continued)

(52) U.S. Cl.
CPC ........ *H04W 72/0413* (2013.01); *H04L 1/0033* (2013.01); *H04L 1/1635* (2013.01);
(Continued)

(58) Field of Classification Search
CPC ............ H04W 52/0235; H04W 72/0406; H04W 72/082; H04W 52/02; H04W 72/1205; H04W 52/0229; H04W 76/048; H04W 72/04; H04W 72/0413; H04L 5/1438; H04L 5/14
(Continued)

(56) References Cited

U.S. PATENT DOCUMENTS

2004/0219924 A1 11/2004 Flynn
2004/0229621 A1 11/2004 Misra
(Continued)

FOREIGN PATENT DOCUMENTS

AU 2013232287 B2 8/2015
BE 1021235 B1 9/2015
(Continued)

OTHER PUBLICATIONS

3GPP TS 32.522 VI 1.1.0 (Dec. 2011); 3rd Generation Partnership Project; Self-Organizing Networks (SON) PolicyNetwork Resource Model (NRM) Integration Reference Point (IRP; Available: Dec. 22, 2011; relevant pp. 14-18 covering sections 4.5 and 4.7.*

(Continued)

*Primary Examiner* — Andrew Lai
*Assistant Examiner* — Albert Shih
(74) *Attorney, Agent, or Firm* — Schwegman Lundberg & Woessner, P.A.

(57) ABSTRACT

A network management device and method for coordination of self-optimization functions in a wireless network. A network management device for coordination of self-optimization functions includes one or more processors and an interface. The interface communicates with a plurality of enhanced node Bs (eNodeBs). The interface is arranged to receive a request to change a coverage or a capacity of an enhanced node B (eNodeB). The interface is further arranged to transmit a query to the eNodeB to obtain a self-optimizing network (SON) coordination state of the eNodeB. The one or more processors are arranged to determine whether to grant or deny the request based on a coordination policy and the SON coordination state.

25 Claims, 5 Drawing Sheets

(51) Int. Cl.

| | | |
|---|---|---|
| H04B 15/00 | (2006.01) | |
| H04W 72/04 | (2009.01) | |
| H04W 24/02 | (2009.01) | |
| H04N 21/414 | (2011.01) | |
| H04N 21/6408 | (2011.01) | |
| H04W 4/06 | (2009.01) | |
| H04L 5/00 | (2006.01) | |
| H04L 5/14 | (2006.01) | |
| H04L 1/18 | (2006.01) | |
| H04W 74/08 | (2009.01) | |
| H04L 12/18 | (2006.01) | |
| H04L 29/06 | (2006.01) | |
| H04N 21/258 | (2011.01) | |
| H04N 21/6405 | (2011.01) | |
| H04W 24/00 | (2009.01) | |
| H04W 28/02 | (2009.01) | |
| H04W 72/08 | (2009.01) | |
| H04W 76/04 | (2009.01) | |
| H04L 1/00 | (2006.01) | |
| H04L 1/16 | (2006.01) | |
| H04L 12/28 | (2006.01) | |
| H04W 52/24 | (2009.01) | |
| H04W 52/14 | (2009.01) | |
| H04W 72/12 | (2009.01) | |

(52) U.S. Cl.
CPC ............ H04L 1/189 (2013.01); H04L 1/1825 (2013.01); H04L 1/1854 (2013.01); H04L 1/1864 (2013.01); H04L 1/1877 (2013.01); H04L 1/1887 (2013.01); H04L 1/1896 (2013.01); H04L 5/001 (2013.01); H04L 5/0053 (2013.01); H04L 5/0055 (2013.01); H04L 5/0073 (2013.01); H04L 5/14 (2013.01); H04L 5/1438 (2013.01); H04L 5/1469 (2013.01); H04L 12/189 (2013.01); H04L 12/2854 (2013.01); H04L 65/601 (2013.01); H04N 21/25841 (2013.01); H04N 21/41407 (2013.01); H04N 21/6405 (2013.01); H04N 21/6408 (2013.01); H04W 4/06 (2013.01); H04W 24/00 (2013.01); H04W 24/02 (2013.01); H04W 28/0236 (2013.01); H04W 28/0268 (2013.01); H04W 28/0278 (2013.01); H04W 52/02 (2013.01); H04W 52/0206 (2013.01); H04W 52/0209 (2013.01); H04W 52/0235 (2013.01); H04W 52/243 (2013.01); H04W 72/04 (2013.01); H04W 72/042 (2013.01); H04W 72/0406 (2013.01); H04W 72/048 (2013.01); H04W 72/0426 (2013.01); H04W 72/082 (2013.01); H04W 72/1205 (2013.01); H04W 72/1284 (2013.01); H04W 74/085 (2013.01); H04W 76/048 (2013.01); H04L 1/1819 (2013.01); H04W 52/0229 (2013.01); H04W 52/143 (2013.01); H04W 72/0446 (2013.01); H04W 72/1268 (2013.01); Y02B 60/50 (2013.01)

(58) Field of Classification Search
USPC .................................................. 370/221, 254
See application file for complete search history.

(56) References Cited

U.S. PATENT DOCUMENTS

| | | |
|---|---|---|
| 2007/0248059 A1 | 10/2007 | Jain et al. |
| 2010/0227603 A1 | 9/2010 | Gupta et al. |
| 2010/0299419 A1 | 11/2010 | Ramankutty et al. |
| 2010/0309782 A1 | 12/2010 | Lee et al. |
| 2013/0072259 A1 | 3/2013 | Kusano et al. |
| 2014/0140278 A1* | 5/2014 | Chou ........................... 370/328 |

FOREIGN PATENT DOCUMENTS

| | | |
|---|---|---|
| CN | 101964985 A | 2/2011 |
| CN | 102056186 A | 5/2011 |
| CN | 102056206 A | 5/2011 |
| CN | 102056336 A | 5/2011 |
| CN | 102098799 A | 6/2011 |
| CN | 102170652 A | 8/2011 |
| CN | 103313283 A | 9/2013 |
| EP | 2110990 A1 | 10/2009 |
| EP | 2309794 A1 | 4/2011 |
| EP | 2373076 A1 | 10/2011 |
| EP | 2624614 A1 | 8/2013 |
| EP | 2782380 A1 | 9/2014 |
| EP | 2811776 A1 | 12/2014 |
| EP | 2826275 A1 | 1/2015 |
| JP | 2010539760 A | 12/2010 |
| NL | 2014569 A | 7/2015 |
| RU | 2596799 C2 | 9/2016 |
| TW | 201352020 A | 12/2013 |
| TW | 201536070 A | 9/2015 |
| WO | WO-2009115554 A1 | 9/2009 |
| WO | WO-2010060483 A1 | 6/2010 |
| WO | WO-2010124501 A1 | 11/2010 |
| WO | WO-2010132884 A1 | 11/2010 |
| WO | WO-2011134401 A1 | 11/2011 |
| WO | WO-2011149085 A1 | 12/2011 |
| WO | WO-2012143055 A1 | 10/2012 |
| WO | WO2013138332 A1 | 9/2013 |

OTHER PUBLICATIONS

Bandh T. et al. "Policy-based Coordination and Management of SON Functions", May 23-27, 2011, Integrated Network Management (IM), 2011 IFIP/IEEE International Symposium on, pp. 827-840.*

Australian Application Serial No. 2013232287, Amendment filed Sep. 2, 2014, 15 pgs.

"San Jose del Cabo, Mexico; CR R11 32.522; CCO-ESM-COC coordination", 3GPP TSG SA WG5 (Telecom Management) SA5#82; S5-120568; Mar. 26-30, 2012, [Online] Retrieved from the Internet: <http://www.mmnt.net/db/0/1/ftp.3gpp.org/tsgsa/WG5TM/TSGS5 82/Docs/>, (Mar. 17, 2012), 4 pgs.

"Self-Organizing Networks (SON) Policy Network Resource Model (NRM) Integration Reference Point (IRP)", 3GPP TS 32.522 version 10.3.0 Release 10, Digital cellular telecommunications system (Phase 2+); Universal Mobile Telecommunications System (UMTS); LTE, 34 pgs.

"Self-Organizing Networks (SON) Policy Network Resource Model (NRM) Integration Reference Point (IRP); Information Service (IS)", 3rd Generation Partnership Project; Technical Specification Group Services and System Aspects; Telecommunication management, (Release 11), [Online] retrieved from the internet: <http://www.3gpp.org/DynaReport/32522.htm>, (Dec. 22, 2011), 32 pgs.

Spanish Application Serial No. P201330362, Search Report mailed Mar. 5, 2014, w/English Translation, 9 pgs.

Swedish Application Serial No. 1350308-1, Office Action mailed Jun. 25, 2014, w/English Translation, 29 pgs.

Taiwanese Application Serial No. 102108459, Office Action mailed Sep. 4, 2014, w/English Translation, 9 pgs.

"Telecommunication management; Project scheduling and open issues for SA5", 3rd Generation Partnership Project; Technical Specification Group Services and System Aspects; (Release 11 ). 3GPP Standard; 3GPP TR 30.821,Jan. 8, 2012 3rd Generation Partnership Project (3GPP), Mobile Competence Centre; 650, route des Lucioles; F-06921 Sophi, 1-57.

"Telecommunication management; Self-Organizing Networks (SON); Self-healing concepts and requirements", 3GPP TS 32.541

(56) References Cited

OTHER PUBLICATIONS

V10.0.0. Technical Specification Group Services and System Aspects. Release 10., (Mar. 2011), 21 pgs.
Lars, Christoph Schmelz, "A coordination framework for self-organisation in LTE networks", Integrated Network Management (IM), 2011 IFIP/IEEE International Symposium on, May 23, 2011 IEEE vol. Pags: 193-200 ISBN 978-1-4244-9219-0: ISBN 1-4244-9219-X DoI: doi:10.1109/INM.2011.5990691. Todo el documento.
Tobias, Bandh, et al., "Policy-based coordination and management of SON functions.", Integrated Network Management (IM), 2011 IFIP/IEEE International Symposium on, May 23, 2011 IEEE, [Online] retrieved from the internet: <http://ieeexplore.ieee.org/stamp/stamp.jsp?tp=&arnumber=5990492&isnumber=5990489>, (May 23-27, 2011), 827-840.
International Application Serial No. PCT/US2013/030511, International Search Report mailed Jun. 21, 2013, 3 pgs.
International Application Serial No. PCT/US2013/030511, Written Opinion mailed Jun. 21, 2013, 4 pgs.
"Telecommunication management; Self-Organizing Networks (SON) Policy Network Resource Model (NRM) Integration Reference Point (IRP); Information Service (IS)", 3GPP TS 32.522 V11.2.0 (Jun. 2012). Technical Specification Group Services and System Aspects. Release 11., (Jun. 2012), 35 pgs.
3GPP TS 32.522 V11.1.0, (2011).
"3rd Generation Partnership Project; Technical Specification Group Services and System Aspects; History of SA5 Telecom Management from 1998", 3gp Draft; SA5 History, 3rd Generation Partnership Project, (Aug. 4, 2011).
Belgium Application Serial No. 2013/0172, Belgium Search Report mailed Nov. 21, 2014, W/ no translation, 11 pgs.
Finnish Application Serial No. 20135242, Office Action mailed Sep. 16, 2014, 2 pgs.
Finnish Application Serial No. 20135242, Office Action mailed Nov. 19, 2014, 6 pgs.
Finnish Application Serial No. 20135242, Reponse filed Oct. 23, 2014 to Office Action mailed Sep. 16, 2014, 36 pgs.
International Application Serial No. PCT/US2013/030511, International Preliminary Report on Patentability mailed Sep. 25, 2014, 6 pgs.
Netherlands Application Serial No. 2010448, Search Report mailed Nov. 4, 2014, 98 pgs.
"3rd Generation Partnership Project; Technical Specification Group Services and System Aspects; Telecommunication management", Self-Organizing Networks (SON) Policy Network Resource Model (NRM) Integration Reference Point (IRP); Information Service (IS) (Release 11), 3GPP TS 32.522 V11.2.0, (Jun. 29, 2012), 17-21.
"3rd Generation Partnership Project; Technical Specification Group Services and System Aspects; Telecommunication management", Self-Organizing Networks (SON) Policy Network Resource Model (NRM) Integration Reference Point (IRP);Information Service (IS)(Release 11) 3GPP TS 3 2.522 V11.1.0, (Dec. 22, 2011), 17-18.
Chinese Application Serial No. 201310083310.X, Office Action mailed Jul. 20, 2015, w/ English Translation, 21 pgs.
"Energy Saving Management (ESM); Concepts and requirements", 3GPP TS 32.551, Release 10, (Aug. 2, 2011), 1-22.
Japanese Application Serial No. 2015-500516, Office Action mailed Jul. 21, 2015, w/ English Translation, 12 pgs.
Korean Application Serial No. 10-2014-7027043, Office Action mailed Aug. 31, 2015, w/ English Translation, 5 pgs.
"Self-Organizing Networks (SON) Policy Network Resource Model (NRM) Integration Reference Point (IRP)", 3GPP TS 32.521 version 10.3.0 Release 10, 1-26.
Spanish Application Serial No. P201330362, Office Action mailed Feb. 24, 2015, w/ English Translation, 18 pgs.
Spanish Application Serial No. P201330362, Office Action mailed Jun. 10, 2015, in English, 9 pgs.
Sweden Application Serial No. 1350308-1, Office Action mailed Mar. 27, 2015, 13 pgs.
Sweden Application Serial No. 1350308-1, Office Action mailed Jun. 30, 2015, 8 pgs.
Sweden Application Serial No. 1550680-1, Office Action mailed Jun. 30, 2015, w/ English Translation.
"3rd Generation Partnership Project", Technical Specification Group Services and System Aspects; Telecommunication management; Self-Organizing Networks (SON) Policy Network Resource Model (NRM) Integration Reference Point (IRP); Information Service (IS); (Release 11 ), (2011).
U.S. Appl. No. 14/165,311, Non Final Office Action mailed Mar. 18, 2016, 27 pgs.
U.S. Appl. No. 14/165,311, Response filed Jul. 13, 2016 to Non Final Office Action mailed Mar. 18, 2016, 11 pgs.
Canadian Application Serial No. 2,866,953, Office Action mailed Dec. 22, 2015, 5 pgs.
Chinese Application Serial No. 201310083310.X, Office Action mailed Apr. 11, 2016, 9 pgs.
Chinese Application Serial No. 201310083310.X, Response filed Jun. 27, 2016 to Office Action mailed Apr. 11, 2016, 15 pgs.
Chinese Application Serial No. 201310083310.X, Response filed Dec. 4, 2015 to Office Action mailed Jul. 20, 2015, with English translation of claims, 14 pgs.
European Application Serial No. 13760813.9, Extended European Search Report mailed Oct. 14, 2015, 7 pgs.
France Application Serial No. 1352322, Office Action mailed Nov. 4, 2015, 8 pgs.
France Application Serial No. 1352322, Response filed Apr. 11, 2016 to Office Action mailed Nov. 4, 2015, not in English, 46 pgs.
Japanese Application Serial No. 2015-500516, Examiners Decision of Final Refusal mailed Mar. 29, 2016, 10 pgs.
Japanese Application Serial No. 2015-500516, Response filed Oct. 19, 2015 to Office Action mailed Jul. 21, 2015, 22 pgs.
Korean Application Serial No. 10-2014-7027043, Office Action mailed Mar. 31, 2016, 9 pgs.
Korean Application Serial No. 10-2014-7027043, Response filed Jun. 8, 2016 to Office Action mailed Mar. 31, 2016, W/ English Translation Of Claims, 27 pgs.
Korean Application Serial No. 10-2014-7027043, Response filed Nov. 2, 2015 to Office Action mailed Aug. 31, 2015, 14 pgs.
Mexican Application Serial No. MX/a/2014/011091, Office Action mailed Feb. 26, 2016, Without English Translation, 2 pgs.
Mexican Application Serial No. MX/a/2014/011091, Response filed May 9, 2016 to Office Action mailed Feb. 26, 2016, Without English Translation, 22 pgs.
Netherlands Application Serial No. 2014569, Office Action mailed Sep. 1, 2015, 9 pgs.
Netherlands Application Serial No. 2014569, Response filed Mar. 4, 2016 to Office Action mailed Sep. 1, 2015, 7 pgs.
Russian Application Serial No. 2014139414, Office Action mailed Dec. 15, 2015, Without English Translation, 3 pgs.
Russian Application Serial No. 2014139414, Response filed Feb. 11, 2016 to Office Action mailed Dec. 15, 2015. 10 pgs.
"Self-Organizing Networks (SON) Policy Network Resource Model Integration Reference", 3GPP TS 32.522 v11.1.0, (Dec. 31, 2011).
Spanish Application Serial No. P201330362, Final Office Action mailed Oct. 30, 2015, w/ English Translation, 6 pgs.
Spanish Application Serial No. P201330362, Response filed Jul. 29, 2015 to Office Action Jun. 10, 2015, not in English, 25 pgs.
Sweden Application Serial No. 1550680-1, Office Action mailed Mar. 8, 2016, 9 pgs.
Sweden Application Serial No. 1550680-1, Response filed Oct. 27, 2015 to Office Action mailed Jun. 30, 2015, Without English Translation, 10 pgs.
Taiwanese Application Serial No. 104103211, Office Action mailed Feb. 15, 2016, 8 pgs.
Taiwanese Application Serial No. 104103211, Response filed May 10, 2016 to Office Action mailed Feb. 15, 2016, 12 pgs.
Bandh, et al., "Policy-Based Coordination and Management of SON Function", Integrated Network Management 12th IFIP/IEEEIM 2011 Application Session, (May 30, 2011), 827-840 pgs.
Neil, Scully, et al., "Measurements, Architecture and Interfaces for Self-Organizing Networks", Internet Citation, [Online] retrieved from the internet:httpy/www.fp7-socrates.eu/files/Deliverables/SOCRATES_D5.

(56) References Cited

OTHER PUBLICATIONS

10%20Measurements,%20architecture%20and%20interfaces%20for%20self-organising%20networks.pdf [gevonden op Mar. 1, 2011], (Oct. 31, 2010), 1-47.
Australian Application Serial No. 2015261557, First Examiner Report mailed Aug. 10, 2016, 3 pgs.
Chinese Application Serial No. 201310083310.X, Office Action mailed Oct. 14, 2016, w/ English Translation, 24 pgs.
European Application Serial No. 13760813.9, Communication pursuant to Article 94(3) EPC mailed Aug. 31, 2016, 5 pgs.
Korean Application Serial No. 10-2014-7027043, Notice of Decision to Grant Received, w/ English Claims, 9 pgs.
Sweden Application Serial No. 1550680-1, Response filed Sep. 8, 2016 to Office Action mailed Mar. 8, 2016, w/ English machine translation, 20 pgs.
U.S. Appl. No. 14/165,311, Notice of Allowance mailed Jul. 29, 2016, 14 pgs.

* cited by examiner

METHOD AND APPARATUS FOR COORDINATION OF SELF-OPTIMIZATION FUNCTIONS IN A WIRELESS NETWORK

CROSS-REFERENCE TO RELATED APPLICATIONS

This application claims priority to U.S. Provisional Patent Application No. 61/612,188 entitled "Wireless Communication Systems and Methods" filed on Mar. 16, 2012, the content of which is incorporated herein by reference in its entirety.

TECHNICAL FIELD

Embodiments pertain to wireless communications. More particularly, embodiments relate to coordination between self-optimization functions for cells within a wireless communication system. Some embodiments relate to the 3rd Generation Partnership Project, Technical Specification Group Services and System Aspects, Telecommunication management, Self-Organizing Networks (SON) Policy Network Resource Model (NRM) Integration Reference Point (IRP), Information Service (IS) 3GPP TS 32.522.

BACKGROUND

Self-optimization, in the context of wireless networks, is the process of analyzing measurements data of enhanced node Bs (eNodeBs), and then tuning radio and transport parameters of eNodeBs in order to achieve optimal network performance, coverage, and capacity. Self-optimization networks (SONs) may implement a variety of SON functions including, for example, Load Balancing, Handover Optimization (HO), Coverage & Capacity Optimization (CCO), Cell Outage Compensation (COC), and Energy Saving Management (ESM). These optimization functions change the coverage and capacity of a cell by configuring parameters of the eNodeB. Example parameters may include transmission power for downlink transmissions, antenna tilt, and azimuth parameters.

In current 3rd Generation Partnership Project (3GPP) long term evolution (LTE) systems, SON functions may operate independently to change these or other parameters of one or more eNodeBs. However, current 3GPP LTE-Advanced systems do not support coordination between SON functions. Therefore, two or more SON functions may simultaneously operate to change the same configuration parameter of the same eNodeB. Conflicts may arise and instability may therefore occur in the affected eNodeB.

Thus there are general needs for systems and methods to coordinate the operation of SON functions within a wireless network.

DETAILED DESCRIPTION

The following description is presented to enable any person skilled in the art to create and use a computer system configuration and related method and article of manufacture to coordinate self-optimizing network (SON) functions performed by domain managers (DMs) or enhanced Node Bs (eNodeBs) within a wireless communications network. Coordination policies are implemented to determine the circumstances under which an eNodeB may implement different SON functions. In at least one example embodiment, the coordination policies take into account the current state of the eNodeB. The coordination policies may further be based on the identity of the desired SON function to which the eNodeB may be changed, or other inputs related to the desired SON function.

Various modifications to the embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the embodiments of the invention with unnecessary detail. Thus, the present disclosure is not intended to be limited to the embodiments shown, but is to be accorded the widest scope consistent with the principles and features disclosed herein.

Figure 1:
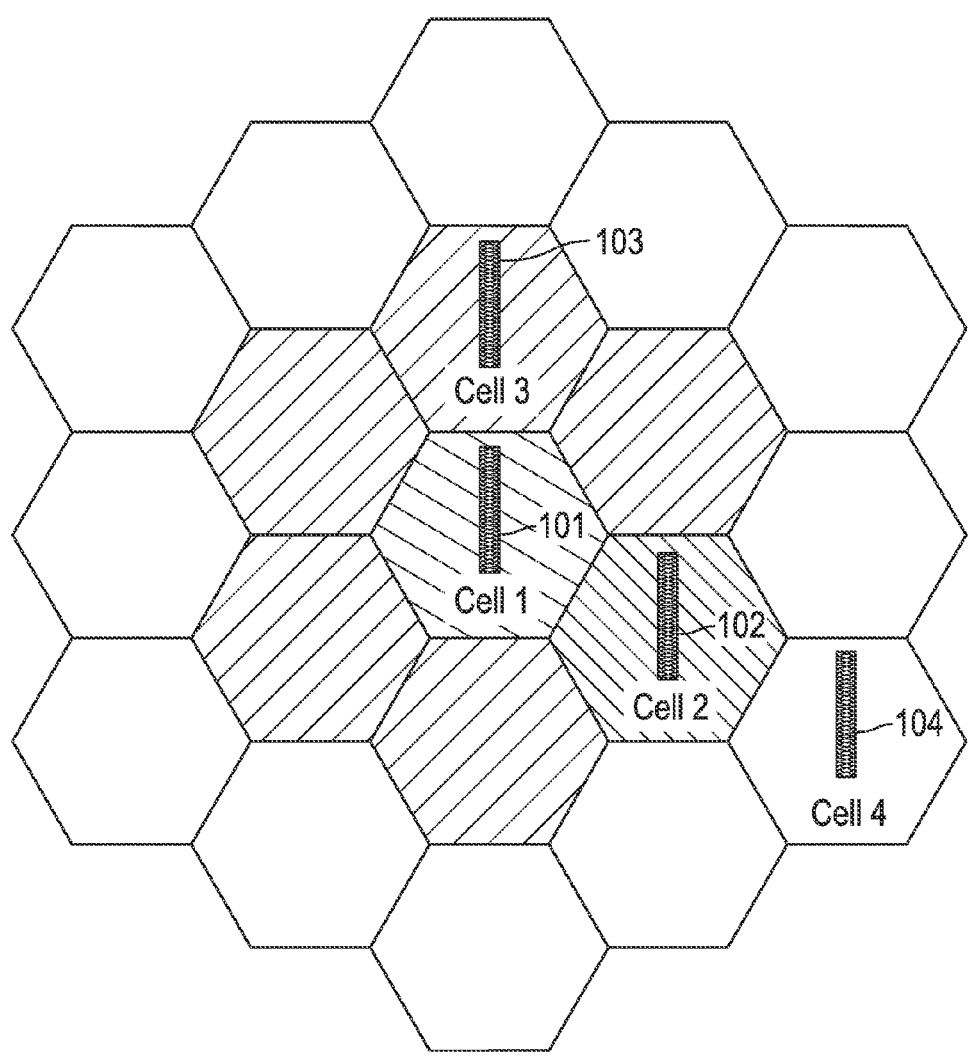
FIG. 1 illustrates an example portion of a wireless communications network in which example embodiments are implemented.

FIG. 1 illustrates an example portion of a wireless communications network 100 in which example embodiments may be implemented. In one embodiment, the wireless communications network 100 comprises an evolved universal terrestrial radio access network (EUTRAN) using the 3rd Generation partnership Project (3GPP) long term evolution (LTE) standard. In one embodiment, the wireless communications network 100 includes a first eNodeB 101, a second eNodeB 102, a third eNodeB 103, and a fourth eNodeB 104 (also referred to as a first base station 101, a second base station 102, a third base station 103). The first eNodeB 101 serves a certain geographic area Cell 1. Similarly, the second eNodeB 102 serves geographic area Cell 2, the third eNodeB 103 serves geographic area Cell 3, and the fourth eNodeB 104 serves geographic area Cell 4.

It is understood that the wireless communications network 100 may include more or fewer than four eNodeBs. It is further understood that each eNodeB may have several neighboring eNodeBs. As an example, eNodeB 103 may have six or more neighboring eNodeBs.

Capacity and Coverage Optimization (CCO), Cell Outage Compensation (COC) and Energy Saving Management (ESM) are SON functions that may change the coverage or capacity of one or more cells in a wireless network. The CCO SON function strives to maximize the coverage of an eNodeB while optimizing capacity and ensuring that inter-cell interference is minimized. The COC SON function configures an eNodeB to compensate for another eNodeB that is in an outage condition. The ESM function extends the coverage of a neighbor eNodeB to cover the eNodeB that is configured to enter into an energy-saving mode. If one of these SON functions changes an eNodeB at the same time that another SON function changes the same eNodeB, conflicts may occur.

As an illustrative example, referring to FIG. 1, if Cell 1 experiences a service outage, the COC SON function will attempt to compensate the outage of Cell 1 by reconfiguring parameters of possible candidate cells. For example, COC may attempt to reconfigure transmission power, antenna tilt and antenna azimuth of eNodeBs 102 and 103 serving Cells 2 and 3 such that eNodeBs 102 and 103 can compensate for the eNodeB serving Cell 1. At the same time, however, the ESM SON function may be operating on Cell 2 to compensate the coverage of neighboring Cell 4 as Cell 4 is entering into an energy saving state. Therefore, in this example, the COC and ESM SON functions may be attempting to operate on Cell 2 simultaneously.

In this illustrative example, from the point in time at which the outage of Cell 1 is detected until Cell 1 has been compensated by Cells 2 and 3, unless there is coordination among SON functions, the COC and ESM SON functions may each attempt to configure different eNodeB 102 settings for transmission power, antenna tilt, and antenna azimuth. For example, COC may attempt to tilt the antenna of eNodeB 102 downward at the same time ESM attempts to tilt the antenna of eNodeB 102 upward, resulting in instability of eNodeB 102.

In example embodiments, a network management device, or network manager (NM) may incorporate a SON coordination mechanism to coordinate coverage and capacity changes of eNodeBs in the network 100 and to thereby provide conflict prevention or conflict resolution among SON functions. The network management device may include an interface that receives a request to change the coverage and capacity of an eNodeB in the network 100. This interface may further transmit a query to the eNodeB to obtain a SON coordination state of the eNodeB. The network management device may further include one or more processors. These processors may execute algorithms that determine whether to grant or deny the request based on a coordination policy and the SON coordination state. Based on the coordination policy and the SON coordination state, the network management device coordinates coverage and capacity changes of the eNodeBs in the network 100 in accordance with coverage and capacity requirements of the coordination policy while minimizing inter-cell interference and energy usage in accordance with the coordination policy.

An NM supporting SON coordination according to example embodiments reads and writes values for a SON coordination state attribute, sonCoordinationState, of eNodeBs in the network 100. Values for this attribute are shown in Table 1:

TABLE 1

Values of sonCoordinationState attribute.

| sonCoordinationState Value | Meaning |
| --- | --- |
| EsmCompensating | Cell is providing the coverage for other cells that are switched off for energy-saving purposes by an ESM SON function |
| EsmEnergySaving | Cell is switched off for energy-saving purposes by an ESM SON function |
| CocCompensating | Cell is providing the coverage of a neighboring cell that is in outage |
| CocOutage | Cell is in outage |
| CcoUpdating | CCO is updating the configuration parameters in a cell |
| None | This cell is not currently being impacted by any SON functions |

Figure 2:
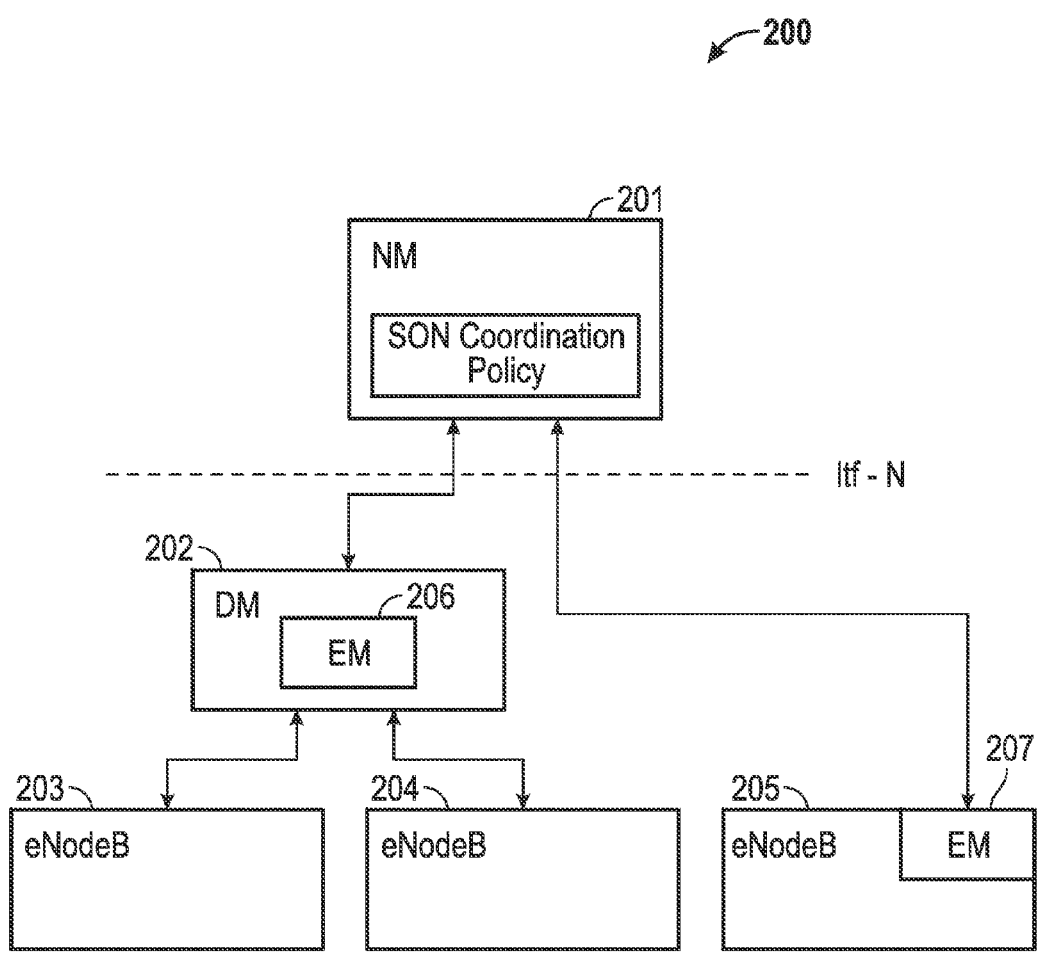
FIG. 2 illustrates an example block diagram showing a system architecture for implementing coordination of self-optimizing network functions according to some embodiments.

FIG. 2 illustrates the architecture of a system 200 for providing a SON coordination function according to at least one example embodiment. As is shown in FIG. 2, a standard interface Itf-N is situated between a network manager (NM) and a domain manager (DM). The Itf-N may be used to transmit performance measurement results data generated in the network, and for the transmission of performance alarms or notifications.

Network elements such as eNodeBs 201, 202 and 203 provide data to support network performance evaluation. Such data may include Quality of Service (QoS) measurements, verification of network configuration, or other parameters. Element managers (EM) 206, 207 administer production of measurement result data by, for example, managing a performance measurement collection process and generating performance measurement results.

An EM 206 may reside in a DM. Example DM tasks include configuration of eNodeBs, fault management, and performance monitoring. Performance monitoring may comprise tasks such as receiving performance data from the eNodeBs 203, 204 and 205.

The eNodeBs 203 and 204 may communicate with the NM 201 through the DM 202. Alternatively, an eNodeB 203 may implement its own EM 207 to directly communicate with the NM 201. In some embodiments, the NM and the SON functions may operate in accordance with 3GPP TS 32.522, although this is not a requirement.

Figure 3:
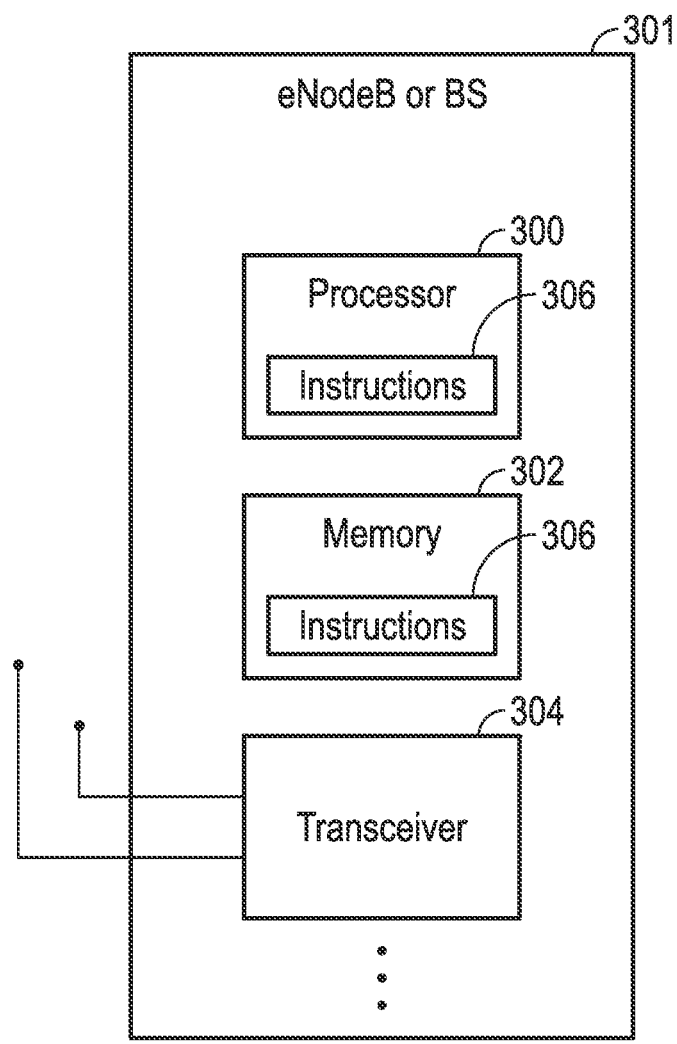
FIG. 3 illustrates an example block diagram showing details of the eNodeBs included in the wireless communications network of FIG. 1 or 2 according to some embodiments.

FIG. 3 illustrates an example block diagram showing details of an eNodeB 301, which may be suitable for uses as any of eNodeBs 101, 102, 103, 104, 203, 204 and 205, according to example embodiments, although other configurations may be suitable. EnodeB 301 may include a processor 300, a memory 302, a transceiver 304, instructions 306, and other components (not shown). The eNodeBs 101, 102, 103, 104, 203, 204 and 205 can be similar to each other in hardware, firmware, software, configurations, and/or operating parameters.

The processor 300 comprises one or more central processing units (CPUs), graphics processing units (GPUs), or both. The processor 300 provides processing and control functionalities for the eNodeB. Memory 302 comprises one or more transient and static memory units configured to store instructions and data for the eNodeB. The transceiver 304 comprises one or more transceivers including a multiple-input and multiple-output (MIMO) antenna to support MIMO communications. The transceiver 304 receives uplink transmissions and transmits downlink transmissions, among other things, with user equipment (UEs). In some embodiments, the transceiver 304 transmits requests to change the coverage and capacity state of the eNodeB. In response to this request, in some embodiments, the transceiver receives a permission notification indicating whether the request to change the coverage state has been granted or denied. Based on whether permission has been granted, in some embodiments, the processor 300 stores a SON coordination state in an associated memory 302 and changes the coverage and capacity state for the eNodeB.

The instructions 306 comprises one or more sets of instructions or software executed on a computing device (or machine) to cause such computing device (or machine) to perform any of the methodologies discussed herein. The instructions 306 (also referred to as computer- or machine-executable instructions) may reside, completely or at least partially, within the processor 300 and/or the memory 302 during execution thereof by the eNodeB. The processor 300 and memory 302 also comprise machine-readable media.

Figure 4:
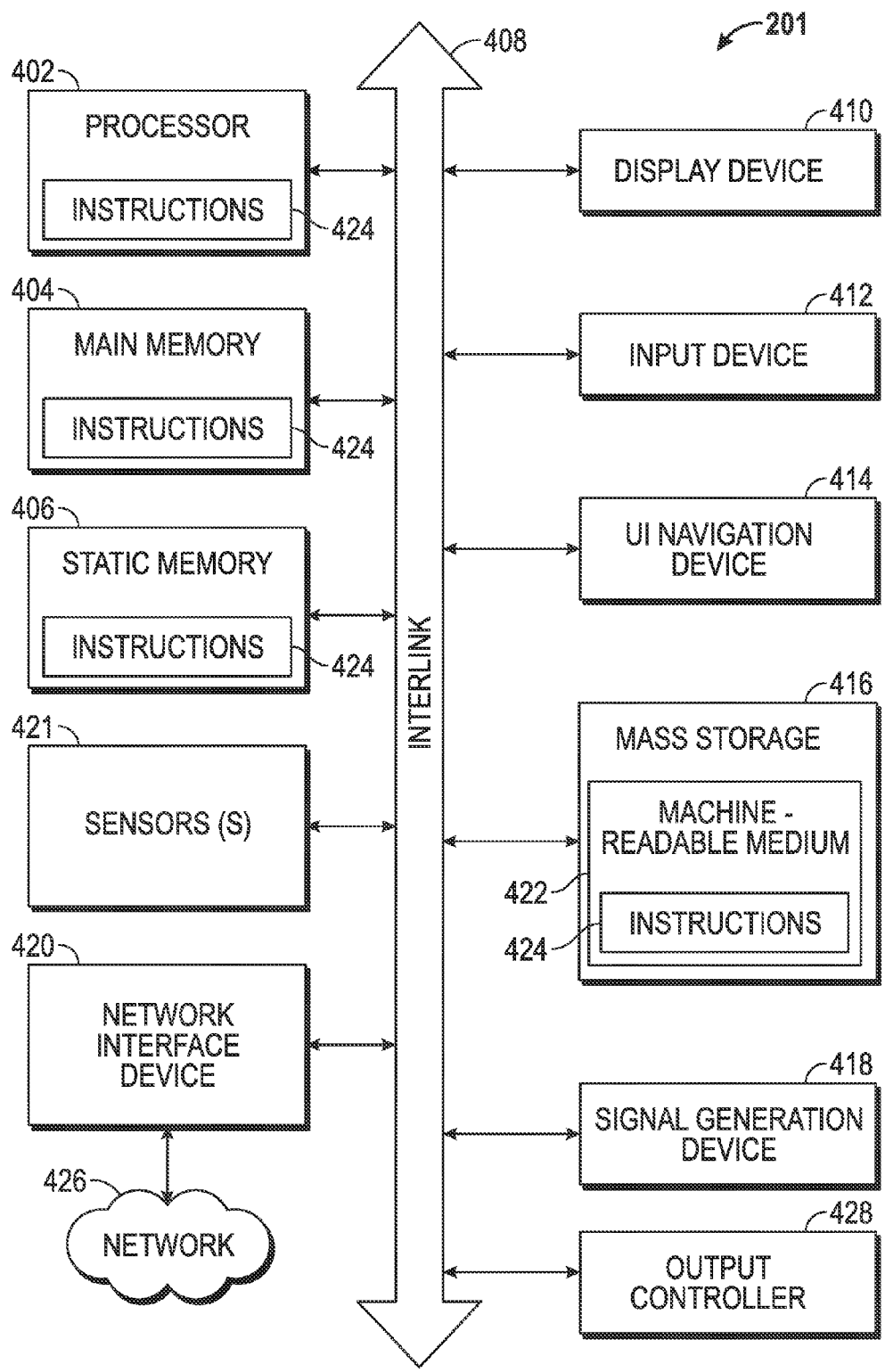
FIG. 4 illustrates an example block diagram showing details of the network manager (NM) included in the system architecture of FIG. 2 according to some example embodiments.

FIG. 4 illustrates a block diagram of an example machine 400 upon which any one or more of the operations performed by the network manager (NM) discussed herein may be performed. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in a peer-to-peer (P2P) (or other distributed) network environment.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 411 (e.g., a mouse). In an example, the display unit 410, input device 417 and UI navigation device 914 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR)) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) that arranged to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). The term "transmission medium" shall be taken to include any intangible medium that is capable of storing, encoding or carrying instructions for execution by the machine 400, and includes digital or analog communications signals or other intangible medium to facilitate communication of such software. The instructions 424 may implement algorithms for SON coordination mechanisms according to example embodiments described below.

Referring again to FIG. 2, the SON coordination function for implementing SON coordination according to example embodiments resides above the Itf-N, and is implemented by instructions 424 on the processor 402 of the NM 201. However, it will be understood that the SON coordination function may reside below the Itf-N. For example, the SON coordination function may reside in the DM 202 for coordination of eNodeBs 203 and 204 or other eNodeBs (not shown) that managed by the DM 202.

Figure 5:
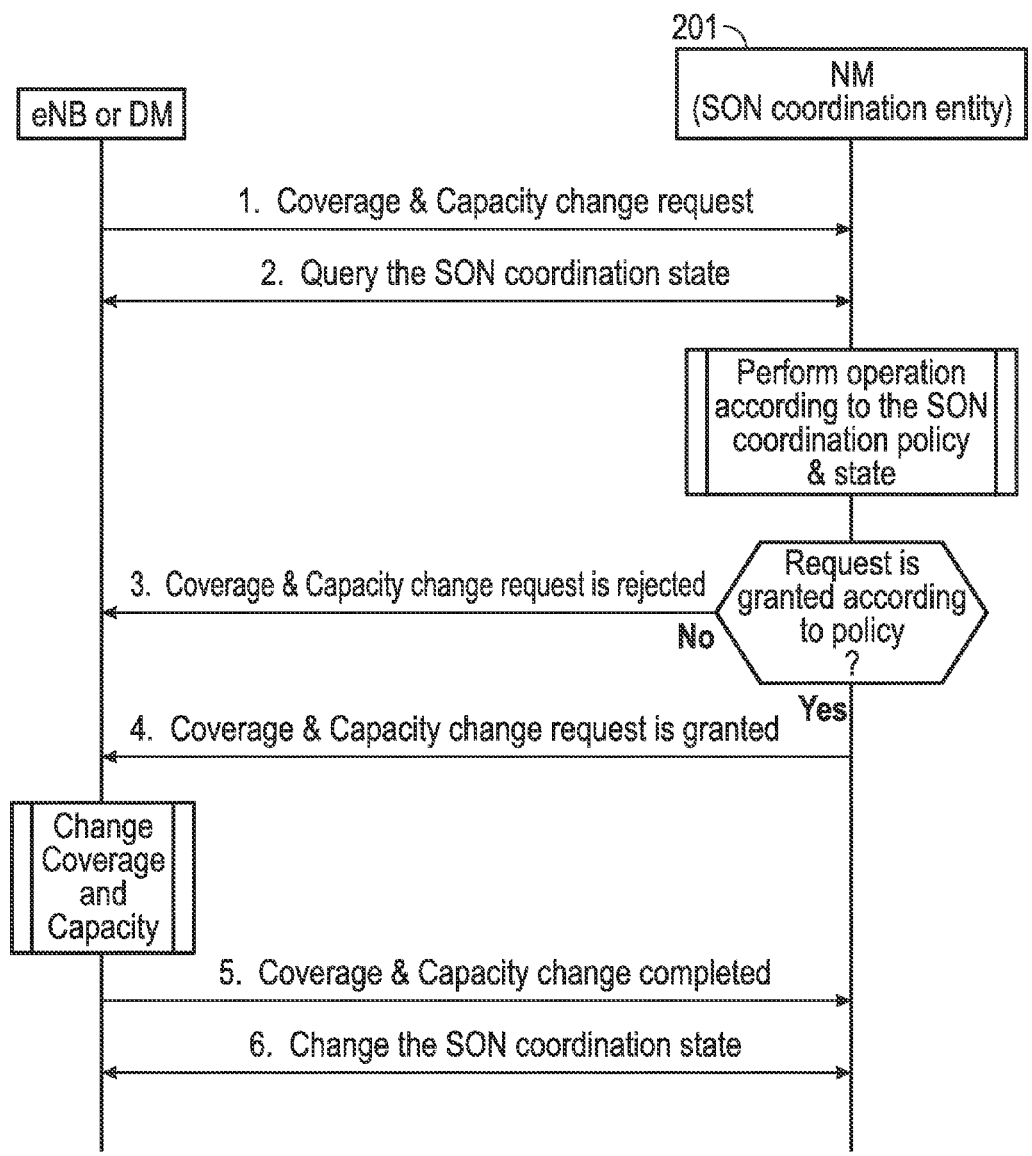
FIG. 5 illustrates a signal flow diagram depicting signals and messages for implementing coordination of self-optimizing network functions.

FIG. 5 illustrates a signal flow diagram depicting signals that pass between an EM and the NM 201 in order to implement a SON coordination function to prevent conflicts between ESM, COC, and CCO SON functions according to example embodiments.

In signal 1, a SON coordination entity receives a request to change the coverage and capacity of an eNodeB of the network. In an example embodiment, the SON coordination entity is the NM 201. The request may be received from a DM 202. Alternatively, the request may be received directly from the eNodeB if the eNodeB includes an embedded EM.

In message 2, the NM queries the DM or eNodeB to obtain the SON coordination state. The SON coordination state indicates the behavior of a cell in supporting CCO, COC and ESM functions, and may include one of the following values: EsmCompensating, EsmEnergySaving, CocCompensating, CocOutage, CcoUpdating, and None.

The NM 201 then determines whether to grant or deny the request based on a SON coordination policy and the SON coordination state. The SON coordination policy is described below. In example embodiments, the SON coordination policy is based on one or more of inputs from a SON function, priority levels assigned by network operators to SON functions, and network operator policies.

If the eNodeB is in the EsmCompensating SON coordination state, and the NM 201 is notified that the cell served by the eNodeB has an outage, then, the SON coordination policy according to example embodiments provides that the NM 201 notifies the ESM function to find another cell to compensate the energy saving cells. If the ESM function is unable to find another cell, then the ESM function is to deactivate energy saving on cells that were compensated by the eNodeB. The NM 201 then changes the SON coordination state of the eNodeB to CocOutage.

If the NM 201 receives a COC request asking eNodeB to compensate a neighboring cell in outage while the eNodeB is in the EsmCompensating SON coordination state, then the SON coordination policy according to example embodiments provides that the NM 201 determines the priority of COC and ESM based on the network operator policy. If the ESM SON function has higher priority, then the COC request is rejected. If the COC SON function has higher priority, then the NM 201 notifies the ESM SON function to find another neighboring cell to compensate the energy saving cells. If the ESM SON function is not able to find another cell to compensate the energy saving cells, then the NM 201 notifies the ESM SON function to deactivate energy saving on cells that were compensated by the eNodeB. The NM 201 then accepts the COC request the NM 201 changes the SON coordination state of the eNodeB to None.

If the eNodeB is in the EsmEnergySaving state, and the NM 201 receives a COC request to compensate a neighboring cell in outage, then the SON coordination policy according to example embodiments provides that the NM 201 should notify the ESM SON function to ask the eNodeB to exit energy saving. If the ESM SON function is unable to request that the eNodeB exit energy saving, then the NM 201 rejects the COC request. If the ESM SON function is able to request that the eNodeB exit energy saving, then the NM 201 accepts the COC request and changes the SON coordination state to None.

If the eNodeB is in the CocCompensating state, and the NM 201 is notified that the eNodeB is experiencing an outage condition, then the SON coordination policy provides that the NM 201 notifies the COC SN function to find one or more neighboring eNodeBs to compensate both the requesting eNodeB and the cells that were previously compensated by the requesting eNodeB. The NM 201 further changes the SON coordination state of the requesting eNodeB to CocOutage.

If the eNodeB is in the CocOutage state, then the NM 201 rejects all requests. If the eNodeB is in the CcoUpdating state, then the NM 201 defers all ESM and COC requests until the SON coordination state changes to None. If the eNodeB is in the None state, then the NM 201 accepts any request from the CCO, COC or ESM SON functions.

If the eNodeB is in either the EsmCompensating state, the EsmEnergySaving state, or the CocCompensating state, and the NM 201 receives a CCO request to change the coverage and capacity of the eNodeB, the NM 201 determines whether to accept the request based on the network operator policy. If the CCO request is to be accepted, then the NM 201 changes the SON coordination state to CcoUpdating.

The NM 201 further does not allow, or rejects, any requests not provided for in the SON coordination policy.

The NM 201 may use one or more pieces of additional data to help prevent conflicts between SON functions. One or more of the parameters may be inputs from one or more of the ESM, CCO or COC SON functions. These inputs may include identifying information for the SON function that is requesting permission to modify configuration parameters of an eNodeB. The identity may include information about the vendor of the SON function, the release number, version, etc. The inputs may further include the time duration that any newly-updated eNodeB configuration parameter should remain unchanged by other or the same SON function. The inputs may still further include the SON targets that are the justification for the configuration change. For example, KPIs may be reported by an eNodeB that has recently undergone a configuration parameter change. This KPI is compared against a SON target value to validate whether the previous changes have made an improvement in KPIs. If the evaluation indicates that sufficient improvement was not made, this may indicate that further optimization and configuration changes should be performed for at least the reporting eNodeB. The inputs may also include any information on the possible impact of a parameter change on other objects in the network, i.e., the impact area of the parameter change.

In order to prevent conflicts, the NM 201 may rely on further information such as the possible impact of the parameter change on Key Performance Indicators (KPIs). The NM 201 may further rely on information on the current state of the eNodeB, the state of certain managed objects in the network, priority of SON functions, and SON coordination policies.

Based on the above-described SON coordination policy, the NM 201 returns either message 3, denying the request, or message 4, granting the request. If the decision is a decision to deny the request, then no further processing occurs and no configuration changes are made. On the other hand, if the decision is a decision to grant the request, the eNodeB or DM changes the coverage and capacity and, in message 5, notifies the NM 201 that the coverage and capacity change has been completed. The eNodeB or DM may further transmit information regarding the success or failure of parameter changes, or the values of parameters before and after parameter changes.

After a SON function has been completed on an eNodeB, the SON coordination state should be changed to one of EsmCompensating, EsmEnergySaving, or CocCompensating. For example, after ESM activates a cell to perform the energy-saving compensation role, the SON coordination state of such a cell should be changed to EsmCompensating. The NM 201 notifies the eNodeB or DM in message 6 that the SON coordination state of the eNodeB should be changed, and the DM or eNodeB stores the new SON coordination state in a memory 302.

In other example embodiments, in addition to or instead of denying or granting a request by a SON function, the NM may configure specific parameters of at least one eNodeB with a specific value. In example embodiments, the NM may prevent parameter changes by one or more SON functions for a specified time after the parameter has been changed by another SON function. The NM may further notify a SON function of a state change that may impact calculation of performance indicators.

In other example embodiments, the NM 201 detects and proactively resolves conflicts between SON functions. The NM 201 may implement such conflict resolution in parallel and in addition to the above-described conflict prevention process. To detect conflicts, the SON coordination function implemented on the NM 201 analyzes data such as, for example, Key Performance Indicators (KPIs), measurements indicating whether the SON functions are meeting their goals, and unacceptable oscillations or variations in eNodeB configuration parameters over time. Anomalies in any of these measurements or data may indicate that SON functions are operating in conflict with each other.

To resolve detected conflicts, the NM 201 may enable, disable or suspend a SON function. The SON configuration function may modify the configuration of certain SON functions, or the SON configuration function may modify configuration parameters of the eNodeBs.

It will be appreciated that, for clarity purposes, the above description describes some embodiments with reference to different functional units or processors. However, it will be apparent that any suitable distribution of functionality between different functional units, processors or domains may be used without detracting from embodiments of the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the spirit and scope of the invention.

The Abstract of the Disclosure is provided to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A network management device, comprising:
   an interface to communicate with a plurality of enhanced node Bs (eNodeBs), the interface being arranged to receive a request to
   change a coverage or a capacity of an enhanced node B (eNodeB) of the plurality of eNodeBs;
   one or more processors arranged to
   determine whether to grant or deny the request based on a coordination policy and a self-optimizing network (SON) coordination state of the eNodeB of the plurality of eNodeBs, the SON coordination state being a state of SON functions, wherein the SON coordination state is one of:
   an energy saving management (ESM) compensating state, wherein the ESM compensating state indicates that a respective eNodeB of the plurality of eNodeBs is already providing coverage for other eNodeBs of the plurality of eNodeBs that are switched off for energy-saving purposes by an ESM SON function,
   a cell outage compensation (COC) compensating state which indicates that a respective eNodeB of the plurality of eNodeBs is already providing coverage of a neighboring eNodeB that is in outage,
   a Coverage and Capacity Optimization (CCO) updating state that indicates that a respective eNodeB of the plurality of eNodeBs is updating the configuration parameters in a respective cell, and
   a SON None state that indicates that a respective eNodeB of the plurality of eNodeBs is not impacted by SON functions.

2. The network management device of claim 1, wherein, based on the coordination policy and the SON coordination state, the network management device is to coordinate coverage and capacity changes of the plurality of eNodeBs at the network level in accordance with coverage and capacity requirements of the coordination policy.

3. The network management device of claim 1, wherein the coordination policy is based on at least one of:
   inputs from at least one SON function, the at least one SON function being at least one of the ESM, COC and CCO SON functions;
   a priority of level of the at least one SON function;
   a network operator policy; and
   a SON coordination state of the eNodeB.

4. The network management device of claim 3, wherein the coordination policy further includes, if the eNodeB is in the ESM compensating state:
   if the request is a COC request requesting that the eNodeB compensate a neighboring eNodeB in outage,
      rejecting the COC request if a network operator policy grants priority to ESM compensation, and granting the COC request if the network operator policy grants priority to COC;
   if the request is a CCO request, determining whether to grant the request based on the network operator policy; and
   if the request is not a COC or CCO request, granting the request.

5. The network management device of claim 3, wherein the coordination policy further includes, if the eNodeB is in the ESM energy saving state:
   if the request is a COC request requesting that the eNodeB compensate a neighboring eNodeB in outage,
      requesting that the ESM function allow the eNodeB to exit an energy saving function, and
         if the ESM function rejects the request, rejecting the COC request, and
         if the ESM function accepts the request, accepting the COC request;
   if the request is a CCO request, determining whether to grant the request based on the network operator policy; and
   if the request is not a COC or CCO request, granting the request.

6. The network management device of claim 3, wherein the coordination policy further includes, if the eNodeB is in the COC compensating state and the request is CCO, determining whether to grant the request based on the network operator policy.

7. The network management device of claim 3, wherein the coordination policy further includes:
   if the eNodeB is in one of the CCO updating state and the COC outage state, rejecting the request,
   if the eNodeB is in the SON None state, granting the request.

8. The network management device of claim 1, wherein,
   the interface is further arranged to receive an indication that an eNodeB in the ESM compensating state is in an outage condition; and
   the one or more processors are further arranged to
      change the SON coordination state of the eNodeB to the COC outage state based on the received indication, and
      notify the ESM SON function that the ESM SON function is to select a second eNodeB to compensate for eNodeBs compensated by the eNodeB in the COC outage state.

9. The network management device of claim 8, wherein, the interface is further arranged to
receive an indication that the ESM SON function is unable to select at least a second eNodeB to perform the ESM function of the eNodeB, and
the one or more processors are further arranged to
notify the ESM SON function that energy saving should be deactivated on eNodeBs compensated by the eNodeB based on the received indication.

10. The network management device of claim 1, wherein, the interface is further arranged to
receive an indication that an eNodeB in the COC compensating state is in an outage condition, and
the one or more processors are further arranged to
change the SON coordination state of the eNodeB to the COC outage state based on the received indication, and
notify the COC SON function that the COC SON function is to select a second eNodeB to compensate (1) the eNodeB in the COC outage state and (2) the eNodeBs compensated by the eNodeB in the COC outage state.

11. The network management device of claim 1, wherein the request is received from an element manager residing in a domain manager in communication with the eNodeB.

12. The network management device of claim 1, wherein the request is received from an element manager residing in the eNodeB.

13. The network management device of claim 1, wherein the one or more processors are further configured to:
receive a notification that the coverage or capacity change has been completed; and
update the SON coordination state of the eNodeB.

14. The network management device of claim 1, wherein the one or more processors are further arranged to:
configure at least one parameter of the eNodeB; and
prevent configuration of the at least one parameter for a duration after the processor has configured the at least one parameter.

15. The network management device of claim 14, wherein the at least one parameter is one of a downlink transmission power and an antenna parameter.

16. The network management device of claim 1, wherein the interface is further arranged to communicate a query to the eNodeB to obtain a SON coordination state of the eNodeB.

17. An enhanced node B (eNodeB) comprising:
an interface to communicate with a network management device, the interface arranged to,
transmit a request to change a coverage or a capacity state, and
receive a permission notification indicating whether the request to change the coverage or the capacity state has been granted or denied, and
one or more processors arranged to,
store a self-optimizing network (SON) coordination state in an associated memory, the SON coordination state being a state of SON functions, wherein the SON coordination state is one of:
an energy saving management (ESM) compensating state, wherein the ESM compensating state indicates that a respective eNodeB of the plurality of eNodeBs is already providing coverage for other eNodeBs of the plurality of eNodeBs that are switched off for energy-saving purposes by an ESM SON function,
a cell outage compensation (COC) compensating state which indicates that a respective eNodeB of the plurality of eNodeBs is already providing coverage of a neighboring eNodeB that is in outage,
a Coverage and Capacity Optimization (CCO) updating state that indicates that a
respective eNodeB of the plurality of eNodeBs is updating the configuration parameters in a respective cell, and
a SON None state that indicates that a respective eNodeB of the plurality of eNodeBs is not impacted by SON functions, and
change the coverage or capacity state based on the permission notification.

18. The eNodeB of claim 17, wherein,
the ESM compensating state indicates that the eNodeB is providing coverage for at least one neighboring eNodeB, the at least one neighboring eNodeB being switched off to conserve energy,
the ESM energy saving state indicates that the eNodeB is switched off to conserve energy,
the COC compensating state indicates that the eNodeB is providing coverage for at least one neighboring eNodeB that is in outage,
the CCO updating state indicates that the configuration parameters of the eNodeB are being updated, and
the SON None state indicates that the eNodeB is not being impacted by SON functions.

19. The eNodeB of claim 17, wherein the one or more processors are further configured to,
transmit an indication that the coverage or capacity is changed; and
store an updated SON coordination state.

20. A method of coordinating coverage and capacity changes in a self-optimizing network (SON), the method comprising:
receiving a request to change a coverage or a capacity of an enhanced node B (eNodeB) of a plurality of eNodeBs; and
determining whether to grant or deny the request based on a coordination policy and a SON coordination state of the eNodeB of the plurality of eNodeBs, the SON coordination state being a state of SON functions, wherein the SON coordination state is one of:
an energy saving management (ESM) compensating state, wherein the ESM compensating state indicates that a respective eNodeB of the plurality of eNodeBs is already providing coverage for other eNodeBs of the plurality of eNodeBs that are switched off for energy-saving purposes by an ESM SON function,
a cell outage compensation (COC) compensating state which indicates that a respective eNodeB of the plurality of eNodeBs is already providing coverage of a neighboring eNodeB that is in outage,
a Coverage and Capacity Optimization (CCO) updating state that indicates that a respective eNodeB of the plurality of eNodeBs is updating the configuration parameters in a respective cell, and
a SON None state that indicates that a respective eNodeB of the plurality of eNodeBs is not impacted by SON functions.

21. The method of claim 20, further comprising:
querying the eNodeB to obtain a SON coordination state of the eNodeB.

22. The method of claim 20, wherein, based on the coordination policy and the SON coordination state, the method coordinates coverage and capacity changes of the plurality of eNodeBs at the network level in accordance with coverage and capacity requirements of the coordination policy.

23. The method of claim 22, wherein denying the request prevents instability in the eNodeB by preventing multiple SON functions from simultaneously changing a same parameter of the eNodeB configuration.

24. The method of claim 22, further comprising:
changing, if the determining determines to grant the request, at least one parameter of the eNodeB, the at least one parameter being one of a downlink transmission power and an antenna parameter.

25. The method of claim 22, wherein the coordination policy grants or rejects the request based on at least one of:
inputs from at least one SON function, the at least one SON function being at least one of ESM, COC and CCO;
a priority of level of the at least SON function;
a network operator policy; and
a SON coordination state of the eNodeB.

* * * * *